Patented Feb. 1, 1927.

1,616,282

UNITED STATES PATENT OFFICE.

KARL SCHRANZ, OF ELBERFELD, AND CLEMENS LUTTER, OF BARMEN-LANGERFELD, GERMANY, ASSIGNORS TO WINTHROP CHEMICAL COMPANY, INC., OF NEW YORK, N. Y.

1-METHOXYMETHYL-3.7-DIMETHYLXANTHINE.

No Drawing. Application filed July 6, 1925, Serial No. 41,870, and in Germany October 29, 1924.

The present invention relates to the manufacture and production of a new pharmaceutically valuable product being chemically the 1-methoxymethyl-3.7-dimethylxanthine having most probably the following formula:

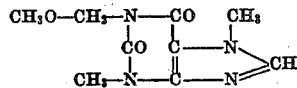

The new product acts like caffein on the human body. It is more soluble in water than caffein. It crystallizes from water in needles melting at from 168–170° C. and forms double salts with salts of organic acids, e. g. with sodium benzoate, sodium salicylate etc.

In order to illustrate the new process more fully the following example is given, the parts being by weight.

A mixture of 200 parts by weight of theobromine (sodium salt), 200 parts by weight of benzene and 90 parts by weight of chloromethylether is heated in an autoclave during 3 hours to 120° C. The 1-methoxymethyl-3.7-dimethylxanthine is isolated by extraction with benzene and crystallized from water or alcohol. Theobromine itself can also be used.

We claim:—

1. The process of producing 1-methoxymethyl-3.7-dimethylxanthine, which process consists in treating a theobromine salt with chloromethylether, substantially as described.

2. The herein described 1-methoxymethyl-3.7-dimethylxanthine crystallizing from water in the shape of needles melting at 168–170° C., forming double salts with salts of organic acids and showing a caffein like action on the human body, substantially as described.

In testimony whereof we have hereunto set our hands.

KARL SCHRANZ.
CLEMENS LUTTER.